(12) United States Patent
Sakamoto et al.

(10) Patent No.: US 8,588,118 B2
(45) Date of Patent: Nov. 19, 2013

(54) WIRELESS COMMUNICATION DEVICE AND WIRELESS COMMUNICATION SYSTEM

(75) Inventors: Takafumi Sakamoto, Machida (JP); Kiyoshi Toshimitsu, Shibuya-ku (JP); Toshiyuki Umeda, Inagi (JP); Shoji Otaka, Yokohama (JP); Keisuke Mera, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 982 days.

(21) Appl. No.: 12/263,070

(22) Filed: Oct. 31, 2008

(65) Prior Publication Data

US 2009/0067356 A1   Mar. 12, 2009

Related U.S. Application Data

(63) Continuation-in-part of application No. 12/040,186, filed on Feb. 29, 2008, now abandoned.

(30) Foreign Application Priority Data

Aug. 24, 2007  (JP) .................................. 2007-218185
Jun. 6, 2008   (JP) .................................. 2008-149409

(51) Int. Cl.
*G08C 17/00*   (2006.01)
*H04B 1/16*    (2006.01)

(52) U.S. Cl.
USPC .......................................... 370/311; 370/339

(58) Field of Classification Search
None
See application file for complete search history.

(56) References Cited

U.S. PATENT DOCUMENTS

| 7,657,248 | B2 | 2/2010 | Hodoshima | |
|---|---|---|---|---|
| 2005/0285803 | A1* | 12/2005 | Iacono et al. | 343/702 |
| 2005/0286446 | A1* | 12/2005 | Barber | 370/278 |
| 2006/0039337 | A1* | 2/2006 | Hodoshima | 370/338 |
| 2006/0056377 | A1* | 3/2006 | Wu et al. | 370/345 |
| 2006/0194597 | A1* | 8/2006 | Ishidoshiro | 455/509 |
| 2006/0268746 | A1* | 11/2006 | Wijting et al. | 370/254 |
| 2007/0041353 | A1* | 2/2007 | Li et al. | 370/338 |
| 2007/0049201 | A1 | 3/2007 | Nagano et al. | |
| 2007/0121536 | A1* | 5/2007 | Aihara | 370/318 |
| 2007/0149133 | A1* | 6/2007 | Lee | 455/67.11 |

(Continued)

FOREIGN PATENT DOCUMENTS

| JP | 2001-156788 | 6/2001 |
|---|---|---|
| JP | 2002-158609 A | 5/2002 |

(Continued)

OTHER PUBLICATIONS

"The IEEE 802.11s Extended Service et Mesh Networking Standard" by Joseph D. Camp and Edward W. Knightly, Electrical and Computer Engineering, Rice Univwersity, Houston, TX, Nov. 2006.

(Continued)

*Primary Examiner* — Chirag Shah
*Assistant Examiner* — Ashley Shivers
(74) *Attorney, Agent, or Firm* — Oblon, Spivak, McClelland, Maier & Neustadt, L.L.P.

(57) ABSTRACT

A wireless communication device includes: a packet detection part detecting presence/absence of a reception of a packet; a judgment part judging whether or not temporal change of presence/absence of the reception of the packet detected in the packet detection part corresponds to a predetermined identifier; and a power source control unit controlling power supply from a power source based on a result of a judgment in the judgment part.

19 Claims, 15 Drawing Sheets

(56) References Cited

U.S. PATENT DOCUMENTS

| | | | |
|---|---|---|---|
| 2007/0268856 A1* | 11/2007 | Wijting et al. | 370/328 |
| 2008/0043778 A1* | 2/2008 | Zhang et al. | 370/503 |
| 2008/0100491 A1 | 5/2008 | Umeda et al. | |
| 2008/0151814 A1* | 6/2008 | Jokela | 370/328 |
| 2008/0225878 A1* | 9/2008 | Cordeiro et al. | 370/437 |
| 2008/0298290 A1* | 12/2008 | Wentink | 370/311 |
| 2009/0034443 A1* | 2/2009 | Walker et al. | 370/311 |

FOREIGN PATENT DOCUMENTS

| | | |
|---|---|---|
| JP | 2004-158908 A | 6/2004 |
| JP | 2006-60336 A | 3/2006 |
| JP | 2006-140912 | 6/2006 |
| JP | 2007-067684 A | 3/2007 |
| JP | 2007-181178 A | 7/2007 |

OTHER PUBLICATIONS

Office Action mailed Apr. 17, 2012, in Japanese Application No. 2008-149409 (with English-language Translation).

Office Action mailed Aug. 28, 2012, in Japanese Application No. 2008-149409 (with English-language Translation).

Office Action issued Jan. 22, 2013 in Japanese Application No. 2008-149409 (With English Translation).

* cited by examiner

WIRELESS COMMUNICATION DEVICE AND WIRELESS COMMUNICATION SYSTEM

CROSS REFERENCE TO RELATED APPLICATION

This application is a continuation-in-part and claims the benefit of priority from U.S. Ser. No. 12/040,186, filed Feb. 29, 2008, which in turn claims the benefit of priority from Japanese Patent Application No. 2007-218185, filed on Aug. 24, 2007; and claims the benefit of priority from Japanese Patent Application No. 2008-149409, filed Jun. 6, 2008, the entire contents of each of which are incorporated herein by reference.

BACKGROUND OF THE INVENTION

1. Field of the Invention

The present invention relates to a wireless communication device, a wireless communication method and a wireless communication system in which lower power consumption is attained.

2. Description of the Related Art

A wireless LAN system employing a wireless base station and a wireless terminal is used. Here, a technology to make the wireless base station consume lower power is disclosed (JP A 2001 156788 (KOKAI)). That is, an entire wireless base station is operated only when a received power equal to or more than a predetermined level is detected, whereby power consumption thereof is reduced.

BRIEF SUMMARY OF THE INVENTION

However, in the above technology, there is a possibility that power consumption of the wireless base station increases due to a reception of a radio wave from other system (Bluetooth, microwave oven, or the like) using the same frequency band as the wireless LAN.

The present invention is made to solve the above problem and its object is to provide a wireless communication device, a wireless communication method, and a wireless communication system in which certainty of power source control is enhanced.

A wireless communication device according to an embodiment of the present invention includes: a packet detection part detecting presence/absence of a reception of a packet; a judgment part judging whether or not temporal change of the presence/absence of the reception of the packet detected by the packet detection part corresponds to a predetermined identifier; and a power source control unit controlling power supply from a power source based on a result of a judgment by the judgment part.

A wireless communication device according to an embodiment of the present invention includes: a transmission instruction unit instructing a transmission of an identifier indicated by temporal change of presence/absence of a transmission of a packet; and a transmission unit transmitting the identifier based on an instruction of the transmission instruction unit.

A wireless communication system according to an embodiment of the present invention includes: a first wireless communication device having a transmission instruction unit instructing a transmission of an identifier indicated by temporal change of presence/absence of a transmission of a packet and a transmission unit transmitting the identifier based on an instruction from the transmission instruction unit; and a second wireless communication device having a packet detection part detecting presence/absence of a reception of a packet transmitted from the transmission unit, a judgment part judging whether or not temporal change of the presence/absence of the reception of the packet detected in the packet detection part corresponds to a predetermined identifier, and a power source control unit controlling power supply from a power source based on a result of a judgment in the judgment part.

DETAILED DESCRIPTION OF THE INVENTION

First Embodiment

Figure 1:
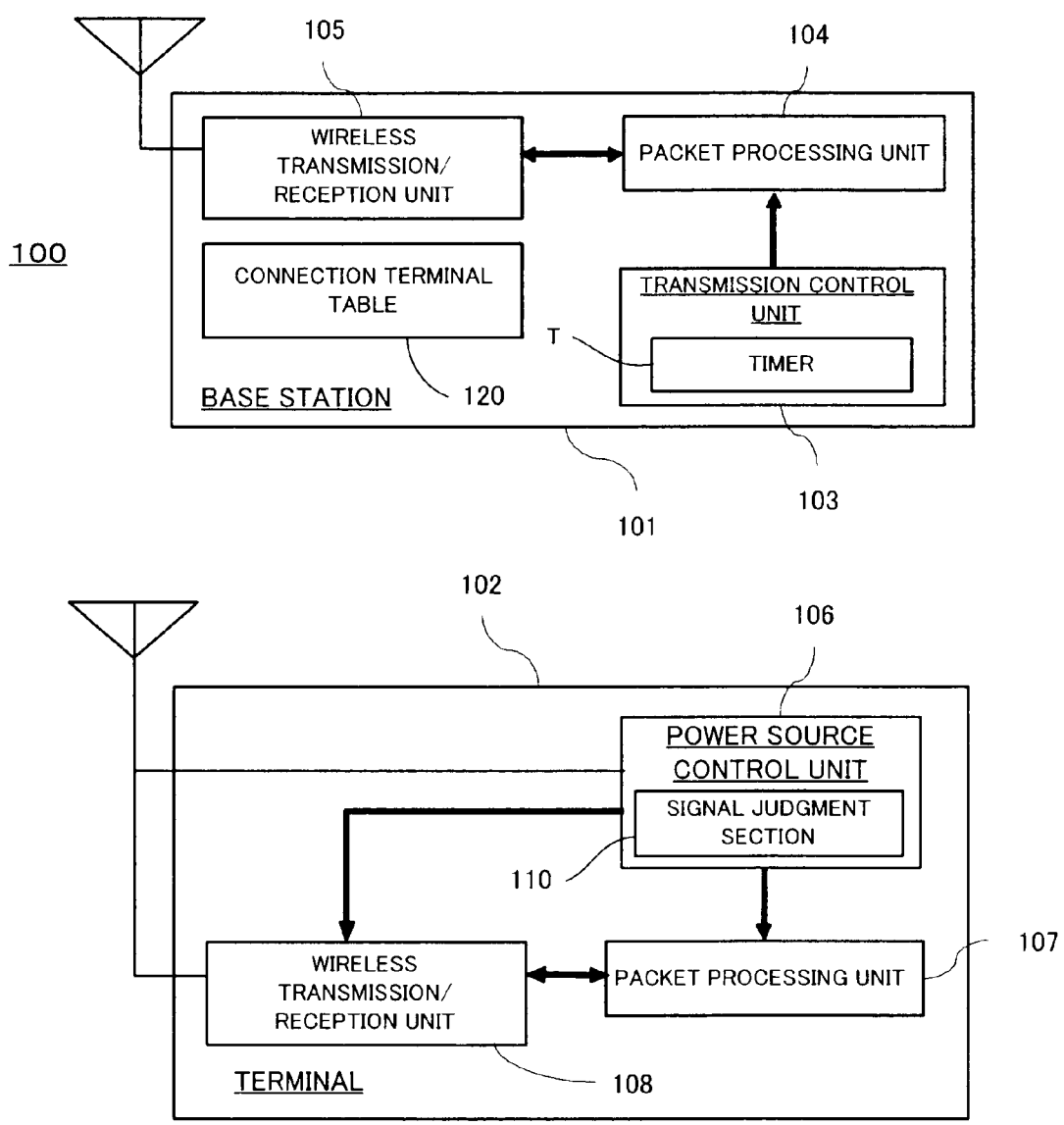
FIG. 1 is a block diagram showing a wireless LAN system according to a first embodiment of the present invention.

Hereinafter, a first embodiment of the present invention will be described in detail with reference to the drawings. FIG. 1 is a block diagram showing a wireless LAN system 100 according to a first embodiment of the present invention. The wireless LAN system 100 includes a base station 101 and a terminal 102. At least one or more terminal(s) 102 is (are) associated and able to be communicated with one base station 101. Association means that the terminal 102 is communicably connected with the base station 101.

The base station 101 is corresponding to an access point defined in IEEE 802.11, and has a transmission control unit 103, a packet processing unit 104, a wireless transmission/reception unit 105, and a connection terminal table 120.

The transmission control unit 103 instructs the packet processing unit 104 to transmit a packet. This packet includes a transmission stop instruction packet and a series of packets indicating an identifier of the base station 101. The transmission stop instruction packet is for instructing the terminal 102 to stop a transmission and is transmitted to every terminal 102 connected with the base station 101.

The transmission control unit 103 has a timer T for a transmission of an identifier. The transmission control unit 103 instructs the transmission of the identifier by a time-out of the timer T. For example, a periodical time-out of the timer T leads to a periodical transmission of the identifier.

The packet processing unit 104 generates a packet to transmit, in accordance with an instruction from the transmission control unit 103. The packet processing unit 104 interprets a packet received by the wireless transmission/reception unit 105.

The wireless transmission/reception unit 105 transmits/receives a packet. More specifically, the wireless transmission/reception unit 105 transmits the packet generated by the packet processing unit 104. The wireless transmission/reception unit 105 receives a packet transmitted from the terminal 102.

The connection terminal table 120 stores an identifier identifying the terminal 102 communicably connected with the base station 101.

The terminal 102 has a wireless transmission/reception unit 108, a packet processing unit 107, and a power source control unit 106.

The wireless transmission/reception unit 108 transmits/receives a packet. More specifically, the wireless transmission/reception unit 108 transmits a packet generated by the packet processing unit 107. The wireless transmission/reception unit 108 receives the packet transmitted from the base station 101.

The packet processing unit 107 interprets a packet received by the wireless transmission/reception unit 108.

The power source control unit 106 controls power sources of the packet processing unit 107 and the wireless transmission/reception unit 108, and has a signal judgment section 110. Details of the signal judgment section 110 will be described later.

(Operation of Wireless LAN System 100)

Hereinafter, an operation of the wireless LAN system 100 will be described.

A. Start-Up of Terminal 102

Figure 2:
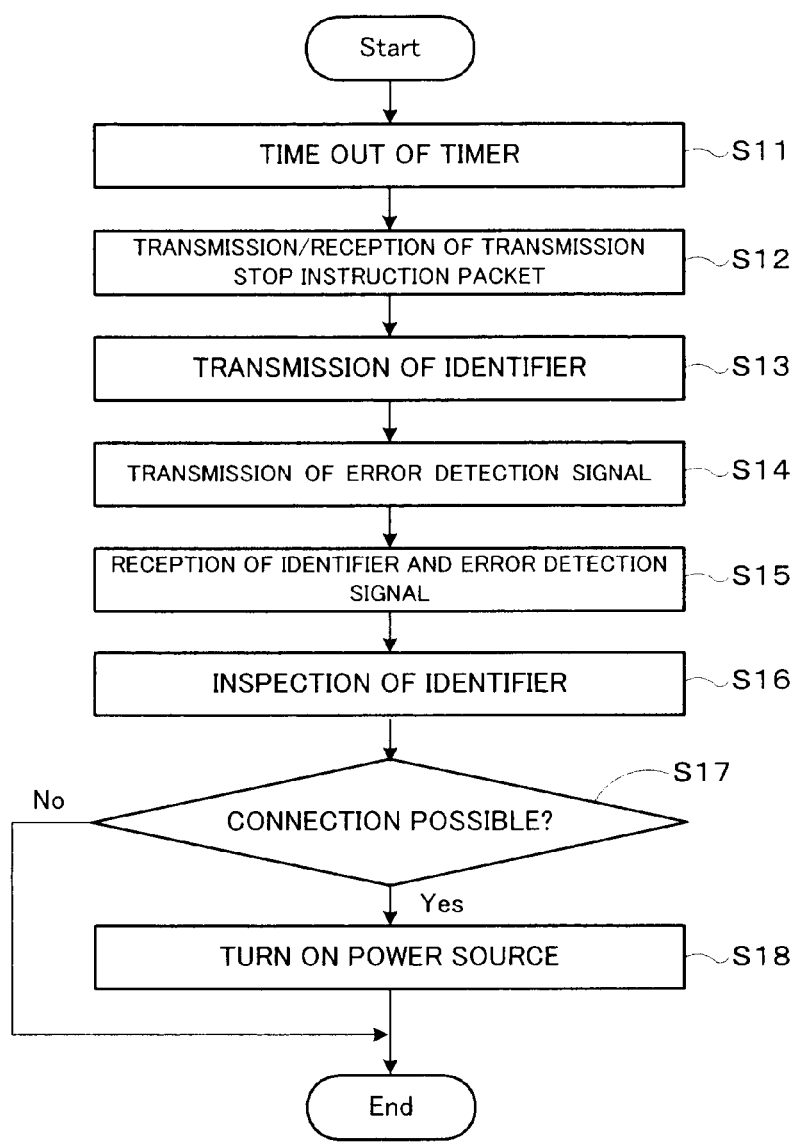
FIG. 2 is a flow chart showing an example of a start-up procedure of a terminal.
Figure 3:
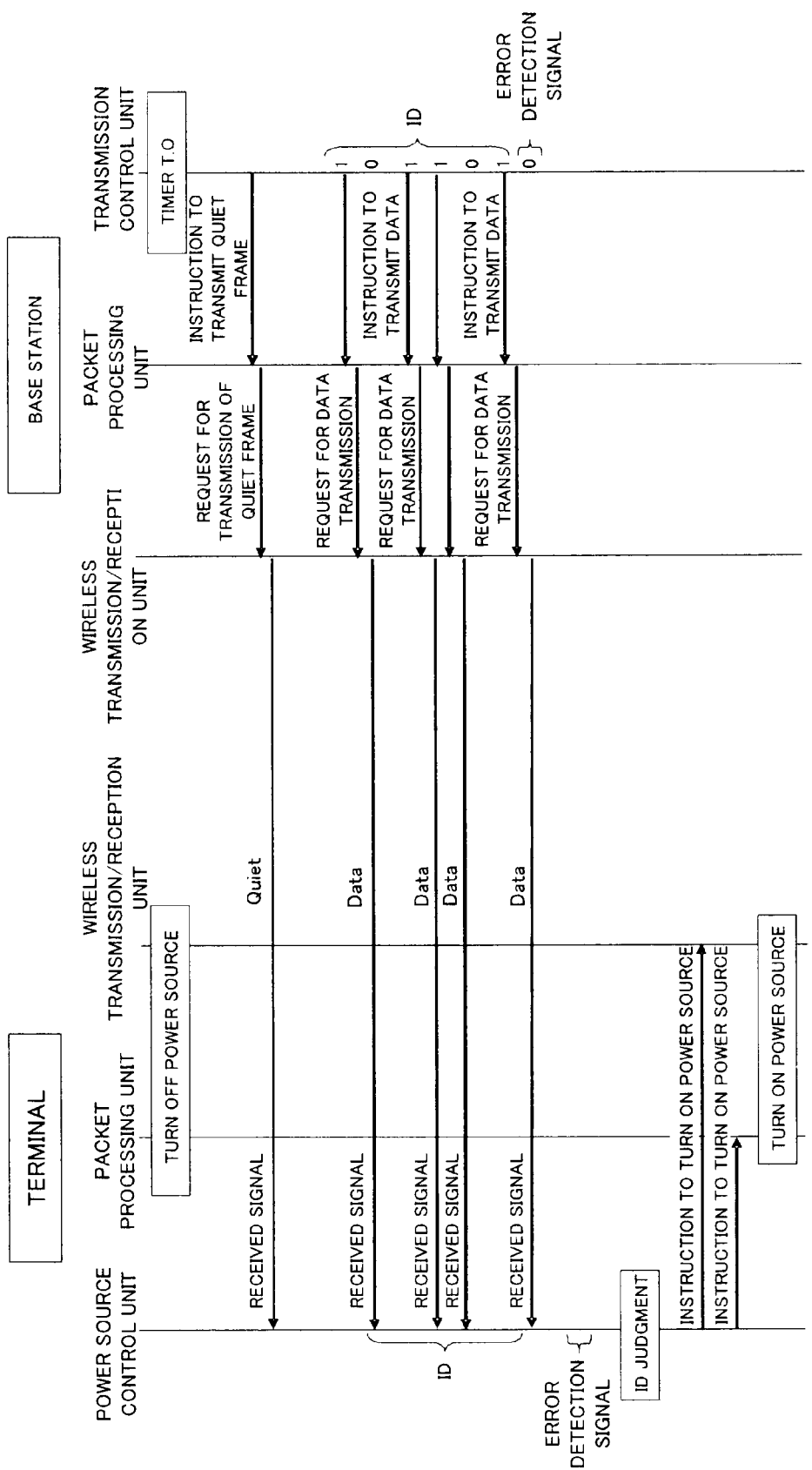
FIG. 3 is a chart showing an example of a flow of signals at a time of the start-up procedure of FIG. 2.

FIG. 2 is a flowchart showing an example of a start-up procedure of the terminal 102. FIG. 3 is a chart showing an example of a flow of signals at a time of the start-up procedure of FIG. 2. In FIG. 2 and FIG. 3, the power sources of the packet processing unit 107 and the wireless transmission/reception unit 108 in the terminal 102 are turned on by a transmission of a predetermined identifier from the base station 101 (a start-up of the terminal 102).

(1) Time-Out of Timer T (Step S11)

The timer T times out. This time-out induces the transmission of the predetermined identifier from the base station 101. For example, the periodical time-out leads to the periodical (for example, once per one second) transmission of the identifier.

(2) Transmission/Reception of Transmission Stop Instruction Packet (Step S12)

In advance of the transmission of the identifier, the transmission control unit 103 may instruct the packet processing unit 104 to transmit a transmission stop instruction packet (for example, "Quiet frame"). As a result of this instruction, the transmission stop instruction packet is created by the packet processing unit 104 and transmitted by the wireless transmission/reception unit 105. The transmission stop instruction packet is transmitted to every terminal 102 associated with the base station 101.

The terminal 102, receiving the transmission stop instruction packet, stops the transmission of the packet for a predetermined time. The predetermined time (transmission stop time ts) can be instructed by the transmission stop instruction packet. On this occasion, as the transmission stop time ts is specified a time (time longer than a time ti required for the transmission of the identifier, for example, about a few times to ten times as long as the time ti) sufficient for the transmission of the identifier. The transmission from the terminal 102 is stopped during the transmission of the identifier from the base station 101. Consequently, certainty that the terminal 102 identifies the identifier from the base station 101 is enhanced.

(3) Transmission of Identifier (ID) (Step S13)

The packet processing unit 104 generates a signal of the identifier by the instruction from the transmission control unit 103. The transmission control unit 103 specifies each packet length and transmission interval, and instructs a transmission of a series of packets. Depending on presence/absence (transmission/non-transmission) of the transmission of the packet (signal) from the wireless transmission/reception unit 105, indication of "1" and "0" is made, and an identifier (ID) indicated by temporal change of "1" and "0" is composed. Continuance of a transmitting state (transmission of a packet, for example, a data frame) for a predetermined time duration makes indication of "1". Continuance of a non-transmission state (for example, non-transmission of a data frame) for a predetermined time duration makes the indication of "0". For this packet, a packet (data frame) addressed to the base station 101 itself can be used.

The wireless transmission/reception unit 105 wirelessly transmits the packet received from the packet processing unit 104. In correspondence with presence/absence of sending of the packet from the packet processing unit 104, presence/absence of the transmission of the packet from the wireless transmission/reception unit 105 is switched. The switching of presence/absence of the transmission means the transmission of the identifier.

(4) Transmission of Error Detection Signal (Step S14)

A signal (error detection signal) to detect an error in the identifier may be transmitted with being added to the identifier. For example, error detection signals 0, 1 respectively indicate cases that even number(s) and odd number(s) of "1" are included in the identifier. In FIG. 3, the number of "1"s included in the identifier is even (four), and so the error detection signal is "0". It should be noted that the error detection signal may be indicated by a plurality of bits instead of by one bit.

(5) Reception of Identifier and Error Detection Signal (Step S15)

The power source control unit 106 of the terminal 102 receives the signals (the identifier and the error detection signal) from the base station 101. The power source control unit 106 judges a reception of a signal of a predetermined time to be "1" and judges a non-reception of a signal of a predetermined time to be "0". The power source control unit 106 detects the identifier and the error detection signal by a combination of the reception and the non-reception.

(6) Inspection of Identifier (Step S16)

The power source control unit 106 inspects by the error detection signal whether or not the identifier includes an error. In other words, the power source control unit 106 adds each bit constituting the identifier to compare a result with the error detection signal. When the addition result coincides with the error detection signal, it is determined that the identifier does not include the error.

(7) Judgment of Identifier, Control of Power Source (Step S17, Step S18)

When the identifier does not include the error, the power source control unit 106 judges whether or not the association is possible. The power source control unit 106 judges whether or not the received identifier coincides with the identifier of the base station 101 with which association is possible. If the identifiers coincide with each other, it is judged that the terminal 102 can be associated with the base station 101. If the identifiers do not coincide with each other, it is judged that the terminal 102 cannot be associated with the base station 101.

If the association with the base station 101 is not possible, the power source control unit 106 does not perform any operation in particular. On the other hand, if the association with the base station 101 is possible, the power source control unit 106 turns on power sources of the packet processing unit 107 and the wireless transmission/reception unit 108 in the terminal 102 (a start-up of the terminal 102). Thereby, the terminal 102 becomes able to be associated with the base station 101.

(Detail of Power Source Control Unit 106)

The power source control unit 106 has the signal judgment section 110 for authorization of the identifier.

Figure 4:
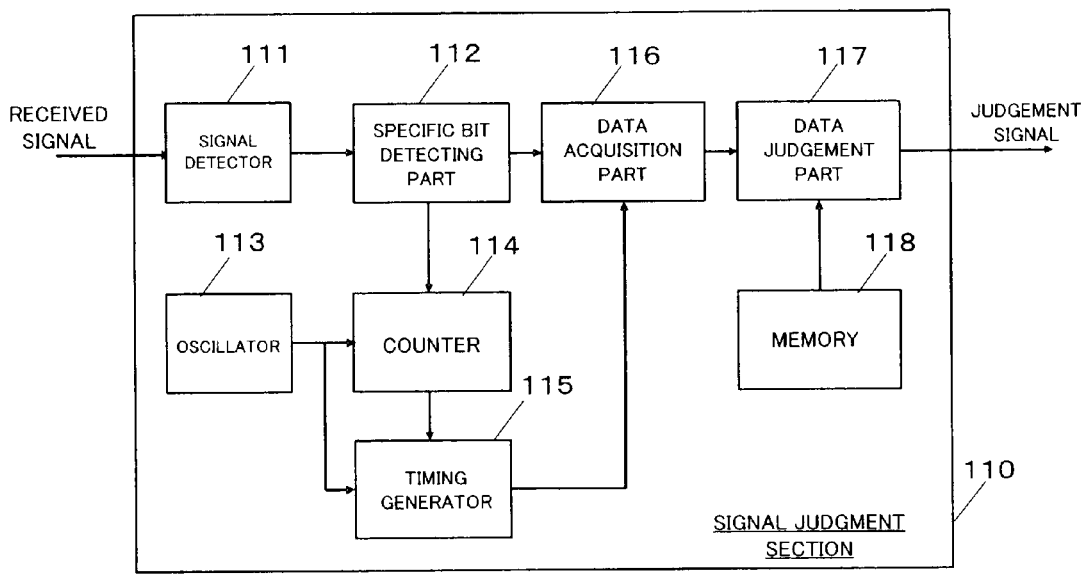
FIG. 4 is a block diagram showing an example of an internal constitution of a signal judgment section.

FIG. 4 is a block diagram showing an example of an internal configuration of the signal judgment section 110. The signal judgment section 110 is an asynchronous signal receiving device and is constituted with a signal detector 111, a specific bit detection part 112, an oscillator 113, a counter 114, a timing generator 115, a data acquisition part 116, a data judgment part 117, and a memory 118. The oscillator 113 is connected with the counter 114 and the timing generator 115. A received signal from an antenna is inputted to the signal detector 111, and a judgment signal is outputted from the data judgment part 117.

The signal detector 111 detects presence/absence of a signal (packet) and generates a data signal indicating a result thereof, functioning as a packet detection part detecting presence/absence of a reception of the packet.

The specific bit detection part 112 detects a specific bit transmitted in advance of an identifier, and controls a start/end of counting in the counter 114.

The oscillator 113 generates a clock signal to be counted in the counter 114.

The counter 114 counts the clock signal by a control from the specific bit detection part 112.

The timing generator 115 determines a timing to acquire data from the data signal.

The data acquisition part 116 acquires data from the data signal at the timing determined in the timing generator 115.

The data judgment part 117 judges whether or not a combination of the acquired data coincides with the identifier, functioning as a judgment part to judge whether or not temporal change of presence/absence of reception of the packet detected in the packet detection part corresponds to a predetermined identifier.

The memory 118 stores an identifier (ID) of a base station 101 with which the terminal 102 can associate.

Figure 5:
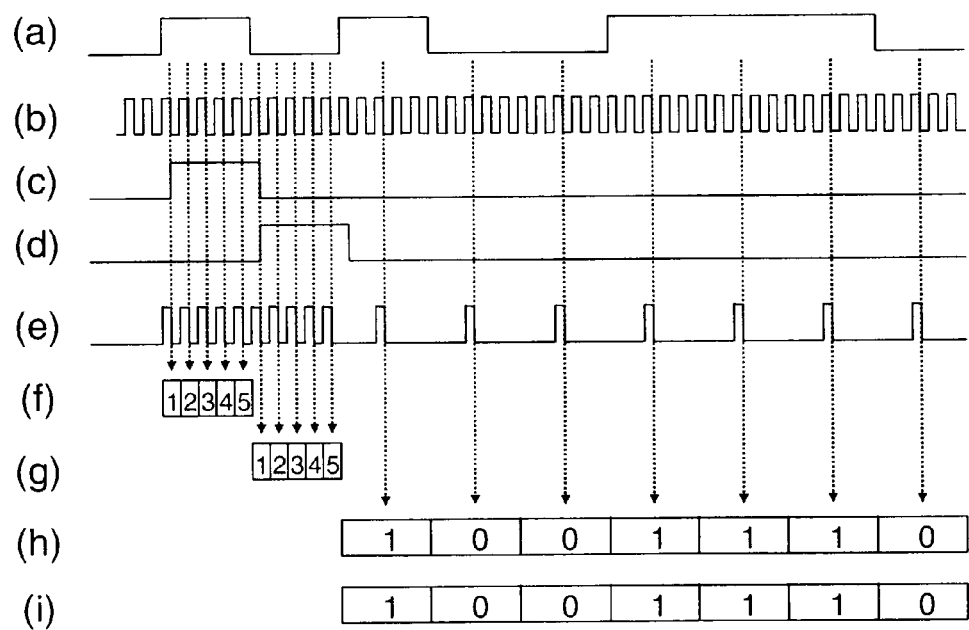
FIG. 5 is a timing chart showing a temporal relation of signals in a power source control unit.

FIG. 5 is a timing chart showing a temporal relation of signals in the power source control unit 106. An operation of the power source control unit 106 will be described based on the timing chart of FIG. 5. Symbols (a) to (i) in FIG. 5 indicate the following signals respectively.

(a): a data signal outputted from the signal detector 111
(b): a clock signal of the oscillator 113
(c), (d): output signals of detection results of the specific bit detection part 112
(e): an output timing signal of the timing generator 115
(f), (g): count data columns of the counter 114
(h): a data column of a received signal collected in the data acquisition part 116
(i): a data column stored in the memory 118

The signal detector 111 detects presence/absence of a signal (for example, a packet) from a received signal from the antenna, and generates a data signal (see (a)). More specifically, depending on whether an intensity of the received signal is equal to or higher than a predetermined value, the received signal is binarized so that the data signal is generated. The binarization is only for distinguishing only the presence/absence of the packet (presence/absence of the signal), and "1" and "0" of data included in the packet are not distinguished. The intensity of the received signal during non-transmission of the packet is smaller than either of intensities of the received signals "1" and "0" during the transmissions of the packets, since the signal itself is not sent from a transmission side. Therefore, the presence/absence of the packet can be detected by binarizing the received signal by means of setting a threshold value between the lower of the intensities of the received signals "1" and "0" during the transmissions of the packets and the intensity of the received signal in a no signal state.

In this example, 3-bit specific bit data "1, 0, 1" is transmitted in advance of the identifier (ID) (see (a)). This specific bit data includes 1-bit "0" and "1" alternately and is added in order to make the identifier receivable in an asynchronous state. In other words, the specific bit data indicates starting of the identifier and a reference value of a pulse length (receiving time) of the bit (pulse) of the bit "0" or "1" constituting the identifier.

The specific bit detection part 112 detects a rising edge of a first bit "1" from the data signal inputted from the signal detector 111, and outputs a signal corresponding to a detection result thereof (see (c)).

Based on the detection result of the specific bit data in the specific bit detection part 112, the counter 114 starts/stops counting the clock signal of the oscillator 113.

The counter 114 starts/stops counting by the detection of the rising edge and a falling edge of the bit of the specific bit data "1" by the specific bit detection part 112. The counter 114 holds a result of the counting. Here, a count number n0 in the counter 114 is "5" (see (f)).

The counter 114 starts/stops counting in accordance with detection of a rising edge and a falling edge of the bit of the next specific bit data "0" by the specific bit detection part 112. The counter 114 holds a result of the counting. Here, a count number n1 in the counter 114 is "5" (see (g)).

If the count numbers n0, n1 of (f) and (g) satisfy a condition (1), the timing generator 115 starts subsequent data collection. Here, since n0=n1=5, the condition (1) is satisfied.

$$n1-\alpha < n0 < n1+\alpha \qquad \text{condition (1)}$$

Here, $\alpha$: a predetermined constant equal to or larger than 1 (for example, 1, 2)

For "1" of a third bit of the specific bit, the timing generator 115 collects data at a timing of the count number (n0/2). A result of (n0/2) is rounded up to the nearest integer. In this case, since n0=5, the data is collected at a timing of three counts later (n0/2=3), and data "1" is obtained.

As for the subsequent data column, data is collected at an interval of the count number n0. In this case, since n=5, data is collected at a timing of five counts later, and data "0" is obtained.

Thereafter, data collection is continued at the interval of the count number n0. The data collection is continued until a predetermined data bit number is reached or a symbol of data end is received. In this example, as a data column, a data column "1, 0, 0, 1, 1, 1, 0" is obtained including the third bit of the specific bit.

The memory 118 stores a specific data column such as an identifier ID (see (i)). In this case, a data column "1, 0, 0, 1, 1, 1, 0" is stored. The data judgment part 117 judges whether or not the data columns of (h), (i) coincide with each other and outputs a signal (for example, a signal "1" indicating coincidence) indicating a judgment result.

Usage of the signal detector 111 enables an asynchronous signal reception. In other words, the clock signal from the oscillator 113 may be unrelated to the received identifier, that is, a data rate of the inputted data column. Further, since a reception of a signal of a short data column is enough, high precision is not required for the oscillator 113. Therefore, for the oscillator 113, usage of a high-cost quartz oscillator or the like, compensation of temperature, and control of an oscillation frequency are not necessary. Thus, the signal detector 111 can be realized by using a simple oscillator 113. Making an entire signal detector 111 into one chip IC (external component such as a quartz oscillator is not necessary) enables a lower cost, reduction of a mounting area, and lower power consumption.

B. Stop of Terminal 102

Figure 6:
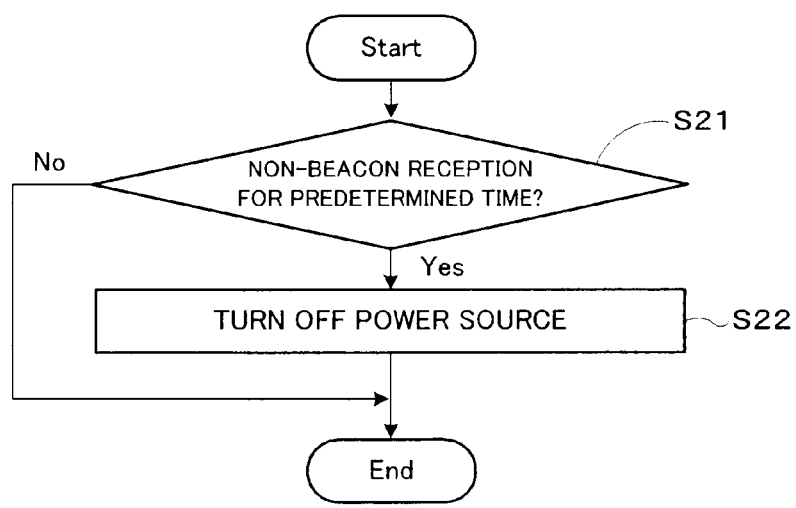
FIG. 6 is a flowchart showing an example of a stop procedure of a terminal.
Figure 7:
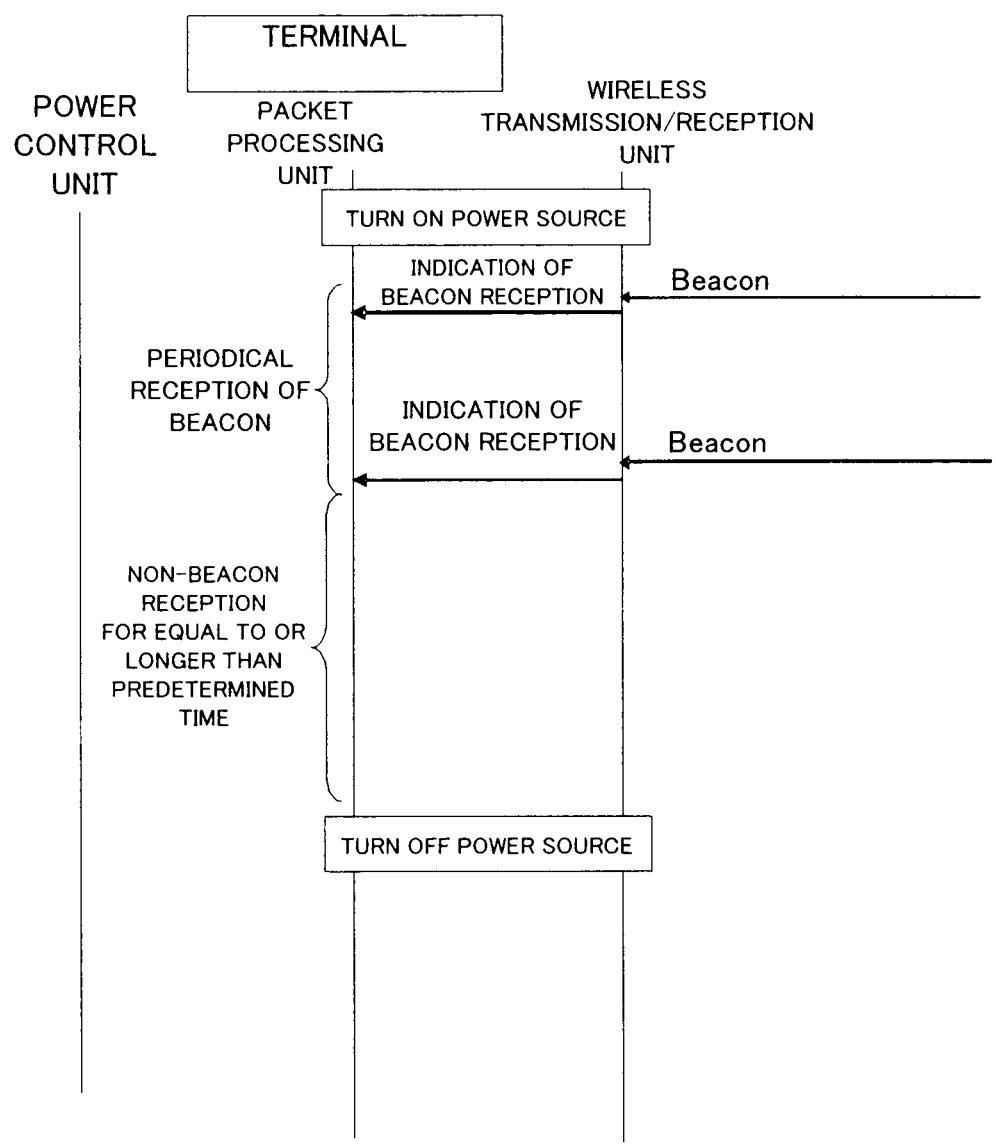
FIG. 7 is a chart showing an example of a flow of signals at a time of the stop procedure of FIG. 6.

FIG. 6 is a flowchart showing an example of a stop procedure of the terminal 102. FIG. 7 is a chart showing an example of a flow of signals at a time of the stop procedure of FIG. 6. In FIG. 6 and FIG. 7, power sources of the packet processing unit 107 and the wireless transmission/reception unit 108 in the terminal 102 are turned off (stop of the terminal 102).

(1) Judgment of Non-Reception of Beacon for Predetermined Time (Step S21)

The packet processing unit 107 judges whether or not a beacon from the base station 101 is unreceived for a predetermined period. The terminal 102 receives the beacons from the base station 101 at fixed intervals in a wireless LAN range. On the other hand, outside the wireless LAN range, the terminal 102 does not receive the beacon from the base station 101. When the beacon from the base station 101 is unreceived for the predetermined period, it can be judged that the terminal 102 is outside the wireless LAN range.

(2) Control of Power Source (Step S22)

When the beacon is unreceived for the predetermined period, the packet processing unit 107 turns off the power sources to the packet processing unit 107 and the wireless transmission/reception unit 108 (stop of the terminal 102). Thereby, increase of power consumption due to an erroneous start-up of the terminal 102 is prevented, when the terminal 102 is outside the wireless LAN range.

As stated above, according to the present embodiment, the following advantages can be obtained.

(1) Recognition of Base Station 101 Possible to be Associated with, Power Source Control The terminal 102 is started up only when the identifier is transmitted from the base station 101 and confirmed. In other words, whether or not to start up the terminal 102 (whether or not to turn on the power source) is determined depending on whether or not the connection is possible (whether or not the association is possible) between the base station 101 and the terminal 102, so that lower power consumption is realized.

(2) Creation of Identifier, Easy Recognition

The identifier can be easily generated by a pattern (packet length (a length of a data frame), a transmission interval) in which the packet is transmitted. The power source control unit 106 of the terminal 102 can easily recognize the identifier from this pattern. A self-addressed data frame defined in IEEE 802.11 can be used for this data frame.

(3) Prevention of Interference to Transmission of Identifier

The base station 101 transmits the transmission stop instruction packet (for example "Quiet frame") before transmitting the identifier. As a result, every terminal 102 associated with the base station 101 stops the transmission for a predetermined time, so that interference to the transmission of the identifier from the base station 101 is prevented. Here, the transmission of the terminal 102 can be stopped by the transmission stop instruction packet for a time based on a length of the identifier transmitted by the base station 101. Consequently, the transmission from the terminal 102 is stopped for a time necessary and sufficient for the base station 101 to transmit the identifier, so that reduction of throughput can be kept to the minimum.

(4) Prevention of Erroneous Recognition of Identifier

The transmission of the error detection signal with being added to the identifier prevents erroneous recognition of the identifier. When an error occurs in the identifier by interference from other base station, terminal or the like neighboring the wireless LAN system 100, the fact the error has occurred can be recognized. As a result, a possibility that the terminal 102 is erroneously started up is reduced.

(5) Lower Power Consumption outside Wireless LAN Range

Without adding a wireless communication device separately other than the wireless LAN, substantial reduction of power consumption of the terminal 102 outside the wireless LAN range is made possible.

Here, in the present embodiment, the terminal 102 may be a base station. In other words, the base station 101 transmits a packet to a neighboring base station (for example, see FIG. 3) to start up (turn on a power source of) this base station. For example, (1) in a case that the number of terminals associated with the base station 101 is equal to or more than a predetermined number, (2) in a case that a quantity of traffic processed by the base station 101 is equal to or more than a predetermined quantity, and (3) in a case that an electric field intensity or a rate of a signal from a terminal associated with the base station 101 is equal or lower than a predetermined level, the base station 101 transmits a packet to start up another base station.

A start-up of another base station enables part of the terminals associated with the base station 101 to associate with this newly started up base station. Consequently, a load of the base station 101 is decreased, enabling an effective operation of the wireless LAN system 100.

Second Embodiment

Figure 8:
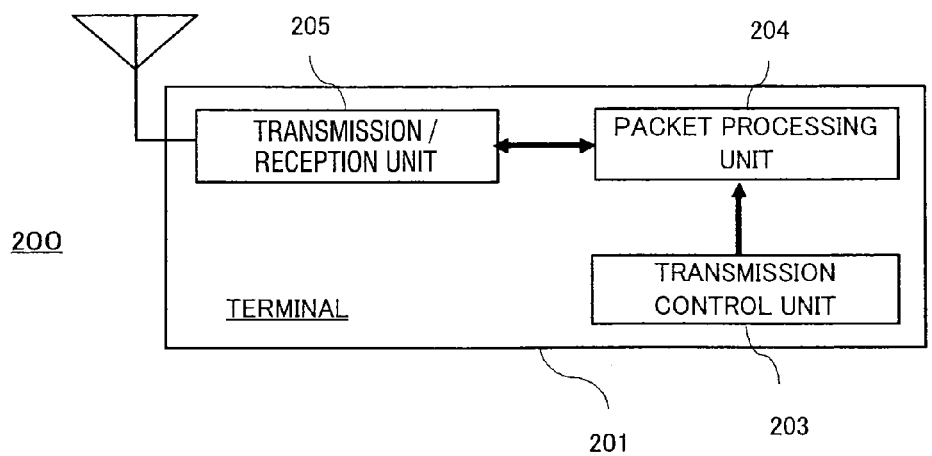
FIG. 8 is a block diagram showing a wireless LAN system according to a second embodiment of the present invention.
Figure 8:
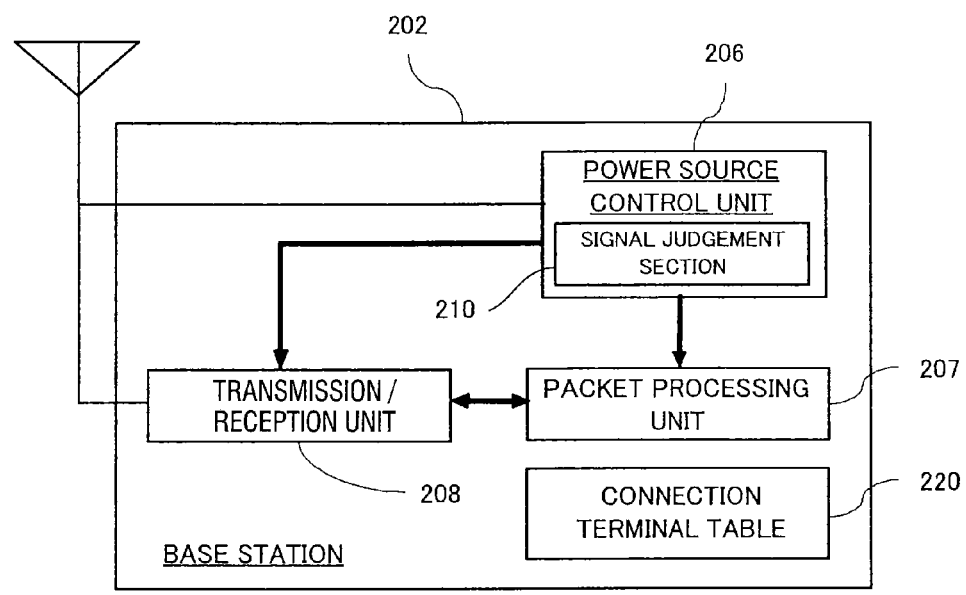

Hereinafter, a second embodiment of the present invention will be described in detail with reference to the drawings. FIG. 8 is a block diagram showing a wireless LAN system 200 according to the second embodiment of the present invention. The wireless LAN system 200 includes a terminal 201 and a base station 202. At least one or more terminal(s) 201 is (are) associated and able to be communicated with one base station 202.

The terminal 201 has a transmission control unit 203, a packet processing unit 204, and a wireless transmission/reception unit 205.

The transmission control unit 203 instructs the packet processing unit 204 to transmit a packet. This packet includes a series of packets indicating an identifier of the base station 201.

The transmission control unit 203 instructs a transmission of an identifier. For example, if the terminal 201 is provided in a main device (for example, a personal computer (PC)), the transmission control unit 203 recognizes that a power source of this main device is turned on, and instructs the transmission of the identifier.

The packet processing unit 204 generates a packet to transmit, in accordance with an instruction from the transmission control unit 203. The packet processing unit 204 also interprets a packet received by the wireless transmission/reception unit 205.

The wireless transmission/reception unit 205 transmits/receives a packet. More specifically, the wireless transmission/reception unit 205 transmits the packet generated by the packet processing unit 204. The wireless transmission/reception unit 205 receives a packet transmitted from the base station 202.

The base station 202 is corresponding to an access point, and has a wireless transmission/reception unit 208, a packet processing unit 207, a power source control unit 206, and a connection terminal table 220.

The wireless transmission/reception unit 208 transmits/receives a packet. More specifically, the transmission/reception unit 208 transmits a packet generated by the packet processing unit 207. The wireless transmission/reception unit 208 receives the packet transmitted from the terminal 201.

The packet processing unit 207 interprets the packet received by the wireless transmission/reception unit 208.

The power source control unit 206 controls power sources of the packet processing unit 207 and the wireless transmission/reception unit 208, and has a signal judgment section 210. The signal judgment section 210 has a similar constitution to that of the signal judgment section 110 in the first embodiment.

The connection terminal table 220 stores an identifier to recognize the terminal 201 to be communicably connected (associated) with the base station 202.
(Operation of Wireless LAN System 200)

Hereinafter, an operation of the wireless LAN system 200 will be described.
A. Start-Up of Base Station 202.

Figure 9:
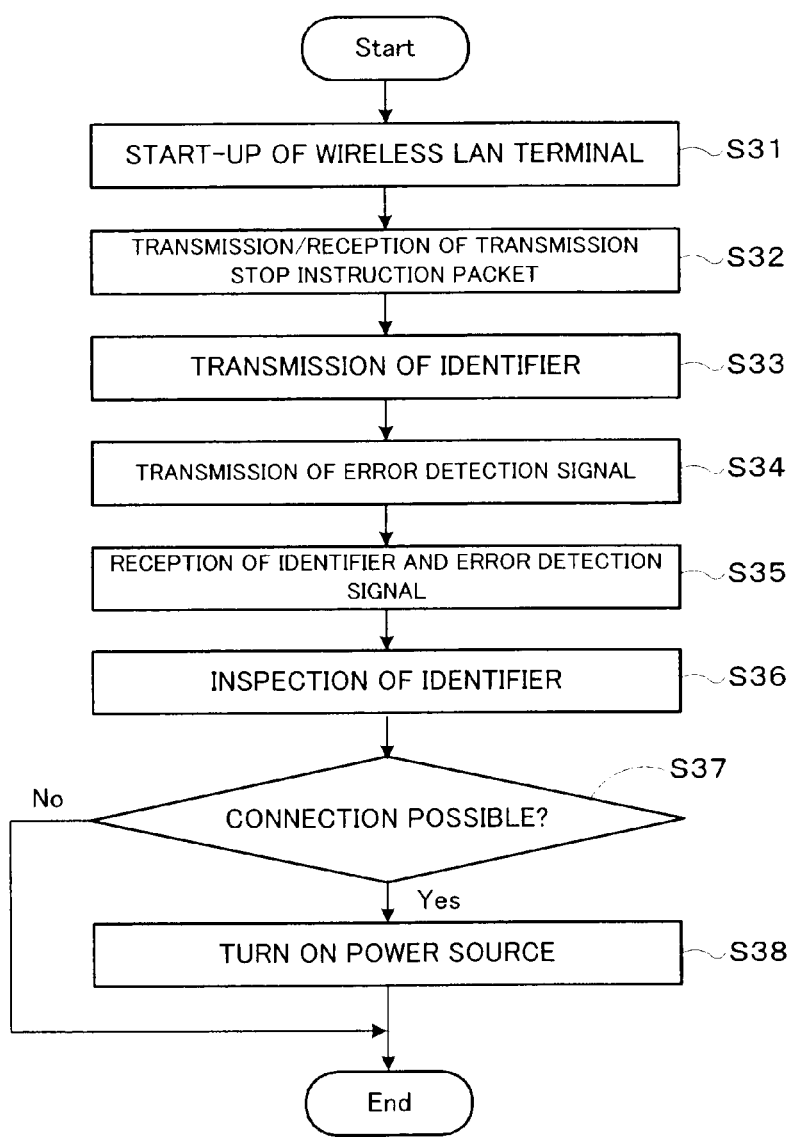
FIG. 9 is a flowchart showing an example of an operation procedure of a base station at a time of a start-up.
Figure 10:
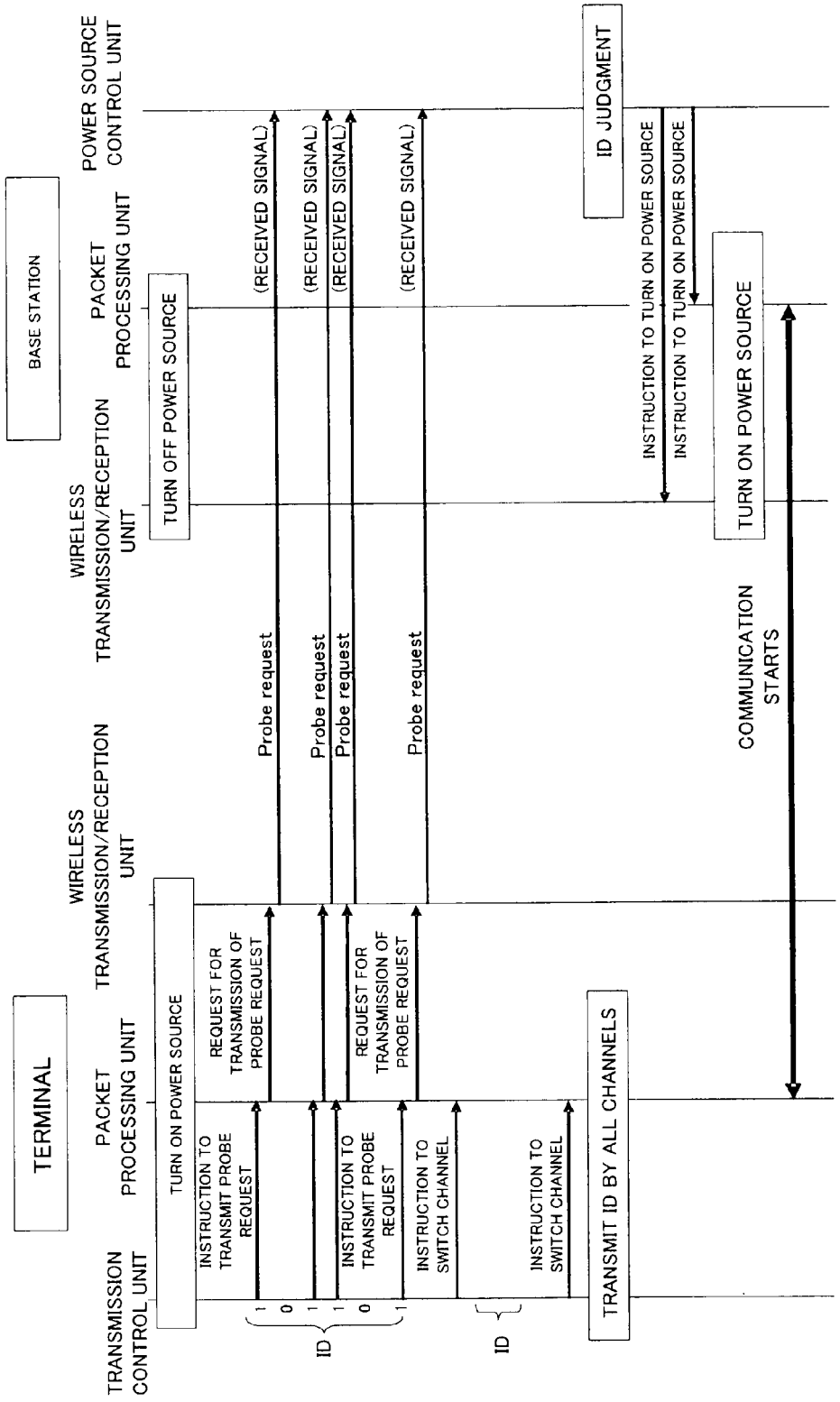
FIG. 10 is a chart showing an example of a flow of signals at a time of the start-up procedure of FIG. 9.
Figure 11:
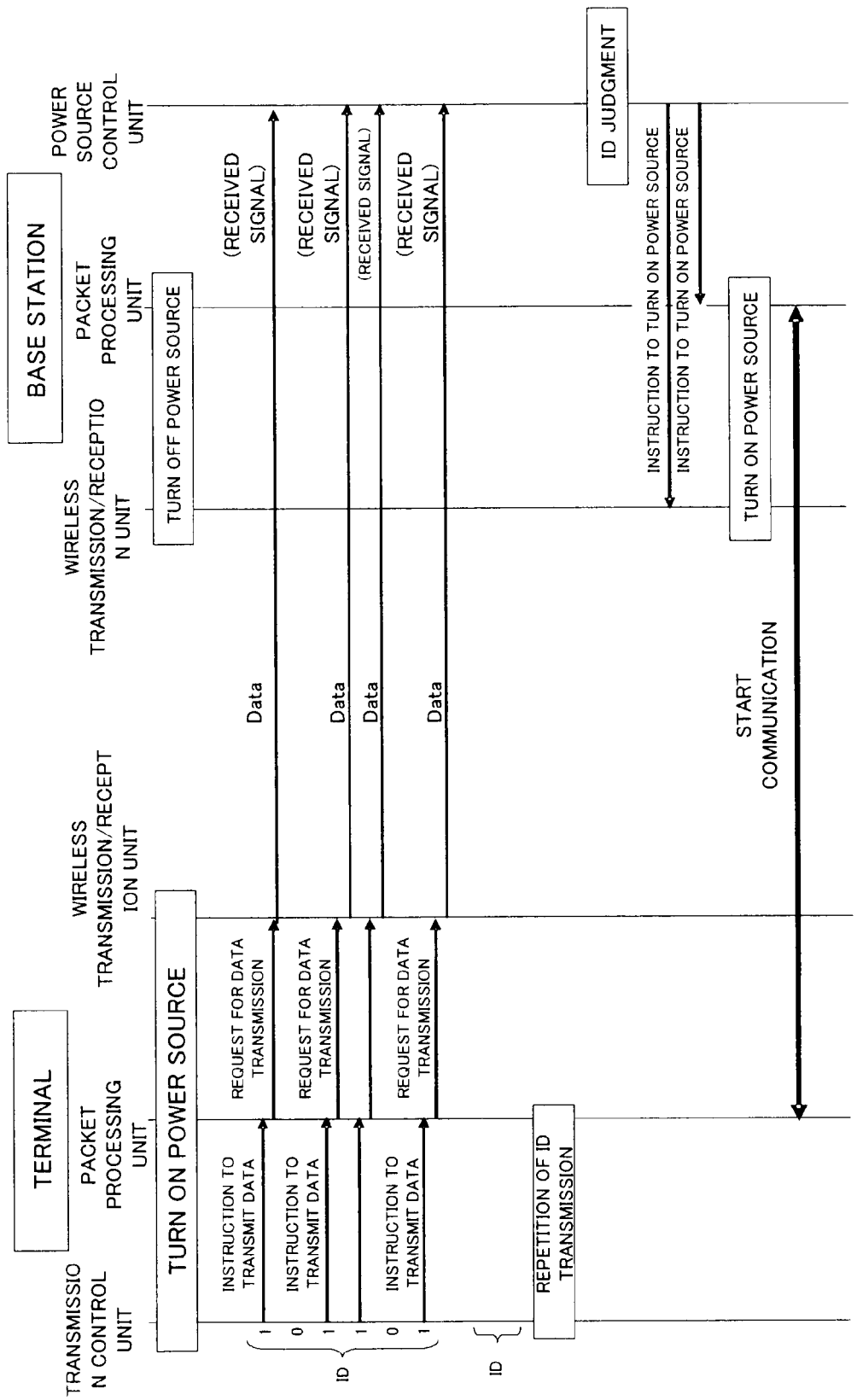
FIG. 11 is a chart showing an example of a flow of signals at the time of the start-up procedure of FIG. 9.

FIG. 9 is a flowchart showing an example of an operation procedure at a time of a start-up of the base station 202. FIG. 10 and FIG. 11 are charts respectively showing examples of flows of signals at a time of the start-up procedure of FIG. 9. In FIG. 9 to FIG. 11, the power sources of the packet processing unit 207 and the wireless transmission/reception unit 208 in the base station 202 are turned on by a transmission of a predetermined identifier from the terminal 201 (a start-up of the base station 202).
(1) Start-Up of Terminal 202 (Step S31)

The terminal 201 starts up. For example, by a start-up of the main device (for example, the PC) mounting the terminal 201, the transmission control unit 203 or the like starts up.
(2) Transmission/Reception of Transmission Stop Instruction Packet (Step S32)

The transmission control unit 203 may instruct the packet processing unit 204 to transmit a transmission stop instruction packet (for example, "Quiet frame"), in advance of the transmission of the identifier. As a result of this instruction, the transmission stop instruction packet is generated by the packet processing unit 204 and transmitted by the wireless transmission/reception unit 205. The transmission stop instruction packet is transmitted to every terminal 201 using the same channel as the terminal 201 does.

The terminal 201, having received the transmission stop instruction packet, stops the transmission of the packet for a predetermined time. The predetermined time (transmission stop time ts) can be instructed by the transmission stop instruction packet. On this occasion, as the transmission stop time ts, there is specified a time (time longer than a time ti required for a transmission of the identifier, for example, about a few times to ten times as long as the time ti) sufficient for the transmission of the identifier. The transmission from another terminal 201 is stopped during the transmission of the identifier from the terminal 201. Consequently, certainty that the base station 202 recognizes the identifier from the terminal 201 is enhanced.
(3) Transmission of Identifier (ID) (Step S33)

The packet processing unit 204 generates a signal of the identifier by the instruction from the transmission control unit 203. Depending on presence/absence (transmission/non-transmission) of the transmission of the packet (signal) from the wireless transmission/reception unit 205, indication of "1" and "0" is made, and an identifier (ID) indicated by temporal change of "1" and "0" is composed, similarly to in the first embodiment.

For the above packet, a packet (for example, "Probe request frame" defined in IEEE802.11) for probing the base station 202 or a packet ("Data frame)" addressed to the terminal 201 itself may be used. In FIG. 10 and FIG. 11, the identifiers are generated by "Probe request frame" and "Data frame", respectively.

The wireless transmission/reception unit 205 wirelessly transmits the packet received from the packet processing unit 204. Depending on presence/absence of sending of the packet from the packet processing unit 204, presence/absence of the transmission of the packet from the wireless transmission/reception unit 205 is switched. The switching of the presence/absence of the transmission means the transmission of the identifier.

Here, it is preferable to transmit the identifier a plurality of times. For example, if another wireless system (a terminal or a base station) is in communication in a neighborhood of the base station 202, there is a possibility that a radio wave of this communication interferes with the identifier transmitted from the terminal 201. By the plural-time transmissions of the identifier by the terminal 201, a possibility becomes high that the power source control unit 206 of the base station 202 recognizes the identifier.

If "Probe request frame" is used for an identifier, the identifier is preferable to be transmitted by all channels. There is a possibility that a base station in the neighborhood of the base station 202 sends back "Probe response frame" to "Probe request frame" and that the transmission of the identifier from the terminal 201 is disturbed. The transmission of the identifier by "Probe request frame" by all the channels of the wireless LAN increases a possibility that the power source control unit 206 of the base station 202 can recognize the identifier.
(4) Transmission of Error Detection Signal (Step S34)

A signal (error detection signal) for detecting an error of an identifier may be transmitted with being added to the identifier. For example, the error detection signals 0, 1 respectively indicate cases that even and odd numbers of "1" are included in the identifier. It should be noted that the error detection signal may be indicated by a plurality of bits instead of by one bit.
(5) Reception of Identifier and Error Detection Signal (Step S35)

The power source control unit 206 of the base station 202 receives signals (an identifier and an error detection signal) from the terminal 201. The power source control unit 206 judges a reception of a signal of a predetermined time to be "1" and judges a non-reception of a signal of a predetermined time to be "0". By the combination of the reception and the non-reception, the power source control unit 206 detects the identifier and the error detection signal.

(6) Inspection of Identifier (Step S36)

The power source control unit 206 inspects by the error detection signal whether or not the identifier includes an error. In other words, the power source control unit 206 adds each bit constituting the identifier to compare a result with the error detection signal. When the addition result coincides with the error detection signal, it is determined that the identifier does not include the error.

(7) Judgment of Identifier, Control of Power Source (Step S37, Step S38)

When the identifier does not include the error, the power source control unit 206 judges whether or not the association is possible. The power source control unit 206 judges whether or not the received identifier coincides with the identifier of the terminal 201 which can be associated with. If the identifiers coincide with each other, it is judged that the terminal 201 can be associated with the base station 202. If the identifiers do not coincide with each other, it is judged that the terminal 201 cannot be associated with the base station 202.

If the terminal 201 cannot be associated, the power source control unit 206 does not perform any operation in particular. On the other hand, if the terminal 201 can be associated, the power source control unit 206 turns on power sources of the packet processing unit 207 and the wireless transmission/reception unit 208 in the base station 202 (a start-up of the base station 202). Thereby, the terminal 201 becomes able to be associated with the base station 202.

In the above, the base station 202 is started up following the start-up of the terminal 201 (that is, with the start-up of the terminal 201 being a trigger). On the other hand, the base station 202 can be started up, triggered by a received signal from the base station associated with the terminal 201. More specifically, the base station 202 can be started up, with a trigger of (1) an electric field intensity of the received signal being equal to or less than a predetermined value, (2) a rate of the received signal being equal to or less than a predetermined value, (3) a QoS parameter of the received signal coming not to be guaranteed, or the like. In this case, a start-up of a new base station 202 in a neighborhood of the terminal 201 enables the terminal 201 to communicate at a quality equal to or better than a predetermined level.

B. Stop of Base Station 202

Figure 12:
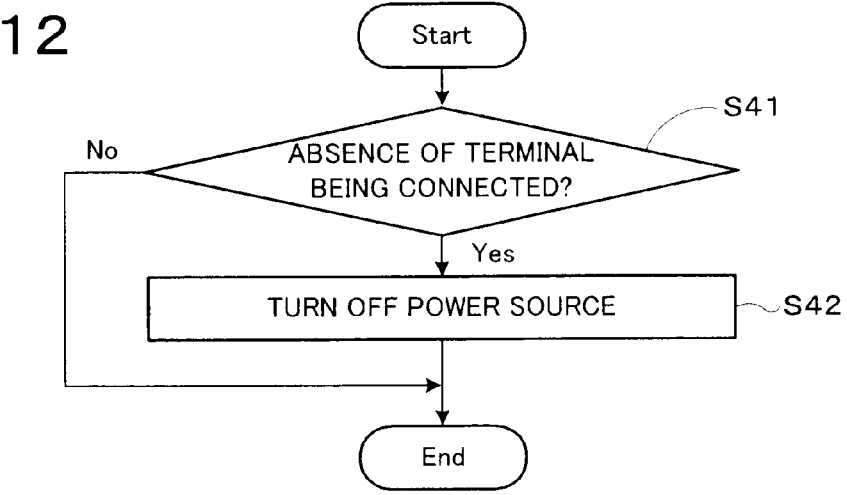
FIG. 12 is a flowchart showing an example of a stop procedure of a base station.
Figure 13:
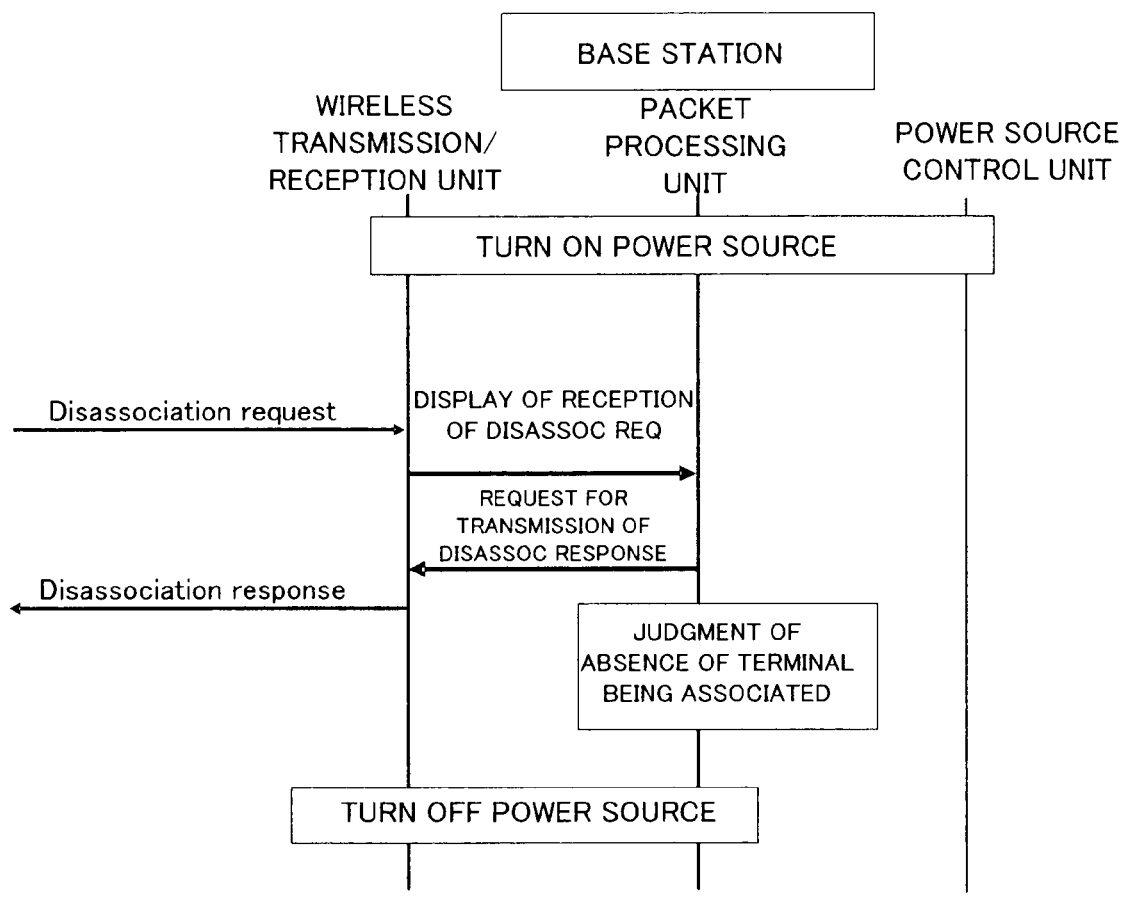
FIG. 13 is a chart showing an example of a flow of signals at a time of the stop procedure of FIG. 12.

FIG. 12 is a flowchart showing an example of a stop procedure of the base station 202. FIG. 13 is a chart showing an example of a flow of signals at a time of the stop procedure of FIG. 12. In FIG. 12 and FIG. 13, the power sources of the packet processing unit 207 and the wireless transmission/reception unit 208 in the base station 202 are turned off (a stop of the base station 202).

(1) Judgment of Presence/Absence of Associated Terminal 201 (Step S41)

The packet processing unit 207 judges presence/absence of a terminal 201 being associated therewith. The terminal 201 comes to be associated with the base station 202 and performs communication. On the other hand, there is a possibility that the terminal 201 cuts a connection with the base station 202 (disassociation) and there is no terminal 201 to be associated (connected) with the base station 202. In this case, it is judged that the stop of the base station 202 is possible.

(2) Control of Power Source (Step S42)

When no terminal 201 being associated exists, the packet processing unit 207 turns off the power sources to the packet processing unit 207 and the wireless transmission/reception unit 208 (the stop of the base station 202). Thereby, electric power consumption of the base station 202 is reduced when a terminal 201 being associated does not exist.

As stated above, according to the present embodiment, the following advantages are obtained.

(1) Recognition of Terminal 201 Possible to be Associated, Power Source Control

The base station 202 is started up only when an identifier is transmitted from the terminal 201 and confirmed. In other words, depending on whether or not the connection between the terminal 201 and the base station 202 is possible (whether or not the association is possible), whether or not to start up the base station 202 (whether or not to turn on the power source) is determined, so that lower power consumption is realized.

(2) Easiness in Creation of Identifier, Power Source Control

An identifier can be easily generated by a pattern (packet length (length of a data frame), transmission interval) in which the packet is transmitted. The power source control unit 206 of the base station 202 can easily recognize the identifier from this pattern. For this data frame, "Probe request" defined in IEEE 8021.11 and self-addressed "Data packet" can be used.

(3) Prevention of Recognition Error by Repeated Transmission

Transmitting the identifier plural times can prevent erroneous recognition of an identifier by the power source control unit 206 of the base station 202. For example, if another terminal or base station is in communication in a neighborhood of the base station 202, there is a possibility that a radio wave of this communication interferes with the identifier transmitted from the terminal 201. Transmitting the identifier plural times by the terminal 201 increases a possibility that the power source control unit 206 of the base station 202 recognizes the identifier.

If "Probe request frame" is used for the identifier, the identifier is preferable to be transmitted by all channels. There is a possibility that a base station in a neighborhood of the base station 202 sends back "Probe response frame" for "Probe request frame" and that the transmission of the identifier from the terminal 201 is disturbed. The transmission of the identifier by "Probe request frame" by all channels of the wireless LAN increases a possibility that the power source control unit 206 of the base station 202 can recognize the identifier.

(4) Prevention of Recognition Error of Identifier

A transmission of an error detection signal with being added to the identifier prevents erroneous recognition of the identifier. When an error occurs in the identifier by interference from another base station, terminal or the like neighboring the wireless LAN system 200, the fact that the error has occurred can be recognized. As a result, a possibility that the terminal 202 is erroneously started up is reduced.

(5) Lower Power Consumption in Case that Terminal 201 Associated with Base Station 202 does not Exist It becomes possible to reduce power consumption of the base station 202 substantially in a case that the terminal 201 associated with the base station 202 does not exist, without adding a wireless communication system separately other than the wireless LAN.

Third Embodiment

Figure 14:
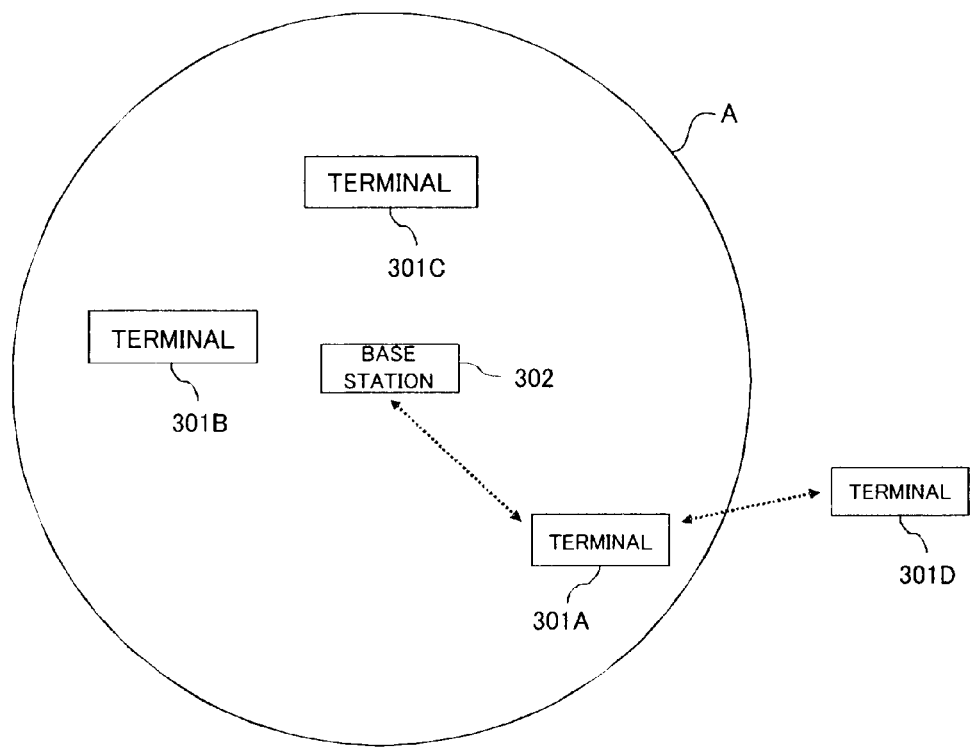
FIG. 14 is a diagram showing an example of a disposition of terminals and a base station in a wireless LAN system according to a third embodiment.

Hereinafter, a third embodiment of the present invention will be described in detail with reference to the drawings. FIG. 14 is a schematic diagram showing a wireless LAN system 300 according to the third embodiment. The wireless LAN system 300 has terminals 301A to 301D and a base station 302. The terminals 301A to 301C are disposed within a communicable area A of the base station 302. The terminal 301D is disposed outside the area A.

The terminals 301A to 301 D each provide a relay function and can relay communication between other terminals 301A to 301D and the base station 302. In FIG. 14, there is shown an example that the terminal 301A relays the communication between the terminal 301D and the base station 302. As a result, the base station 302 communicates with the terminal 301D beyond the directly communicable area A, so that the wireless LAN can be formed.

The wireless LAN system 300 can correspond to standard IEEE802.11s, for example. The terminal 301A and the base station 302 respectively function as a Mesh Point (MAP) and a Mesh Portal (MPP) of the standard IEEE802.11s, for example. In other words, the terminal 301D can be connected to a wired network via the terminal 301A (MAP) and the base station 302 (MPP).

Figure 15:
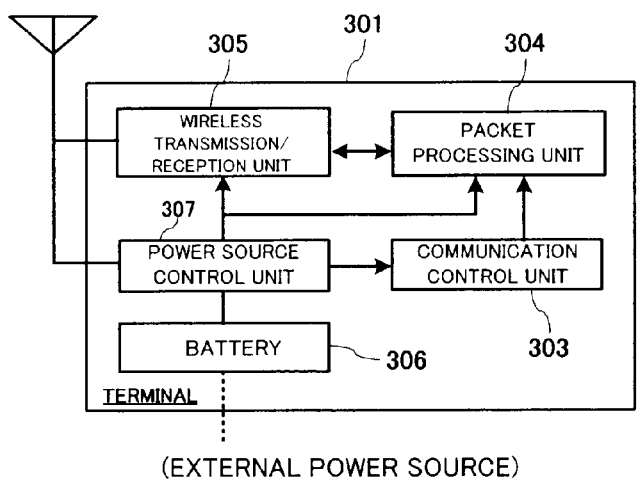
FIG. 15 is a block diagram showing an internal configuration of the terminal.

FIG. 15 is a block diagram showing an internal configuration of the terminal 301A (301). The terminal 301 includes a communication control unit 303, a packet processing unit 304, a wireless transmission/reception unit 305, a battery 306, and a power source control unit 307. It should be noted that when the terminals 301B to 301D have the relay function, a constitution thereof is the same as that in FIG. 15.

The communication control unit 303 functions as the following (1) to (4).
(1) A transmission control unit instructing the packet processing unit to transmit a packet
This packet includes a series of packets indicating a predetermined identifier.
(2) A base station detection unit detecting the base station 302
(3) A relay unit relaying communication between the base station 302 and another terminal 301
(4) Generation unit generating the predetermined identifier The packet processing unit 304 generates a packet to transmit, in accordance with an instruction from the transmission control section 303. Further, the packet processing unit 304 interprets the packet received by the wireless transmission/reception unit 305.

The wireless transmission/reception unit 305 transmits/receives a packet. More specifically, the wireless transmission/reception unit 305 transmits the packet generated by the packet processing unit 304. The wireless transmission/reception unit 305 receives the packet transmitted from the base station 301 or another terminal 302.

The battery 306 stores an electric power supplied from an external power source.

The power source control unit 307 controls power supply from the battery 306 to the packet processing unit 304 and the wireless transmission/reception unit 305. More specifically, the electric power supplied to the packet processing unit 304 and the wireless transmission/reception unit 305 is switched to two stages of a low power state and a high power state. The former and the latter are respectively referred to as a power off state and a power on state. It should be noted that even in a case of the power off state, judgment of whether or not temporal change of packet reception corresponds to the predetermined identifier is possible.

The power source control unit 307 functions as the following (1) to (4).
(1) A packet detection part detecting presence/absence of packet reception
(2) A judgment part judging whether or not temporal change of presence/absence of the packet reception detected in the packet detection part corresponds to the predetermined identifier
(3) A connection detection part detecting whether or not the battery 306 is connected to the external power source
(4) A measurement part measuring a remaining amount of the battery 306

Figure 16:
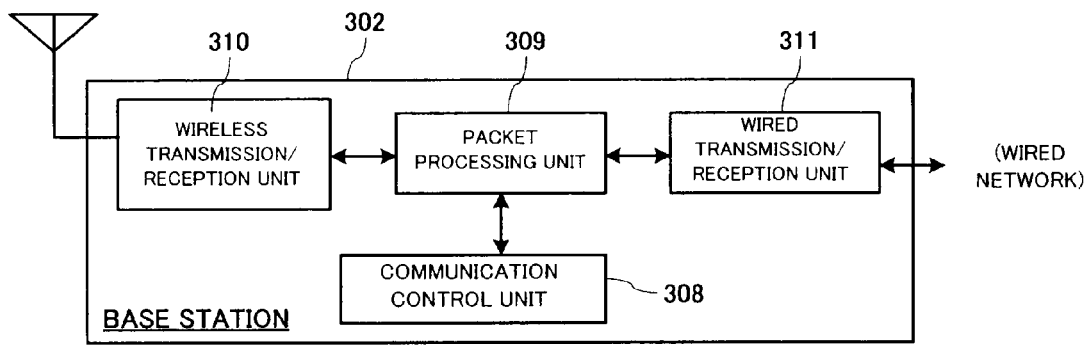
FIG. 16 is a block diagram showing an internal configuration of the base station.

FIG. 16 is a block diagram showing an internal constitution of the base station 302. The base station 302 includes a communication control unit 308, a packet processing unit 309, a wireless transmission/reception unit 310, and a wired transmission/reception unit 311.

The communication control unit 308 controls transmission/reception of a packet.

The packet processing unit 309 generates a packet to transmit in accordance with an instruction from the communication control unit 308. Further, the packet processing unit 309 interprets the packet received by the wireless transmission/reception unit 310.

The wireless transmission/reception unit 310 wirelessly transmits/receives the packet. More specifically, the wireless transmission/reception unit 310 transmits the packet generated by the packet processing unit 309. The wireless transmission/reception unit 310 receives the packet transmitted from the terminal 301.

The wired transmission/reception unit 311 transmits/receives a packet by wire. More specifically, the wired transmission/reception unit 311 transmits the packet generated by the packet processing unit 309. The wired transmission/reception unit 311 receives the packet transmitted from a wired network.

(Operation of Wireless LAN System 300)

Figure 17:
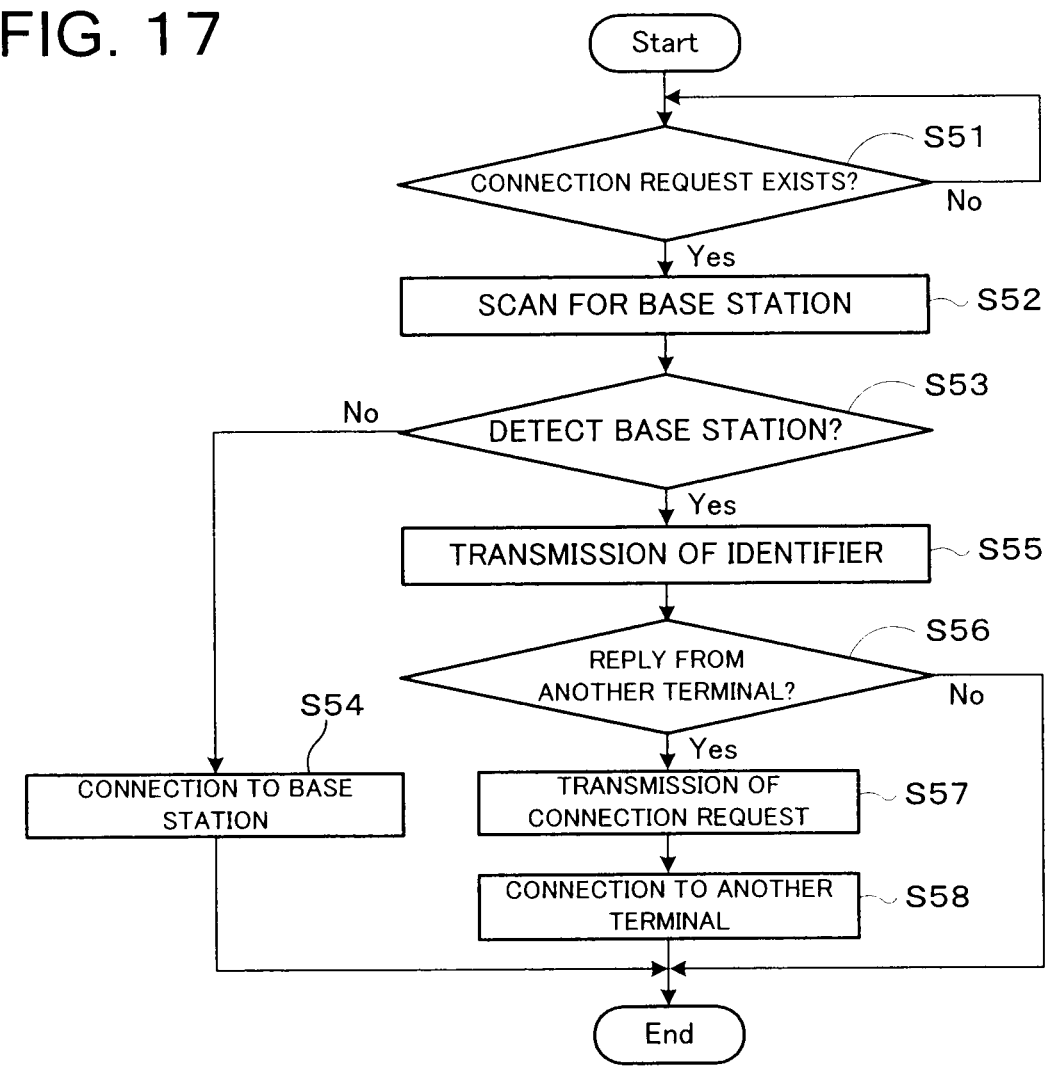
FIG. 17 is a flowchart showing an example of an operation procedure of the terminal.
Figure 18:
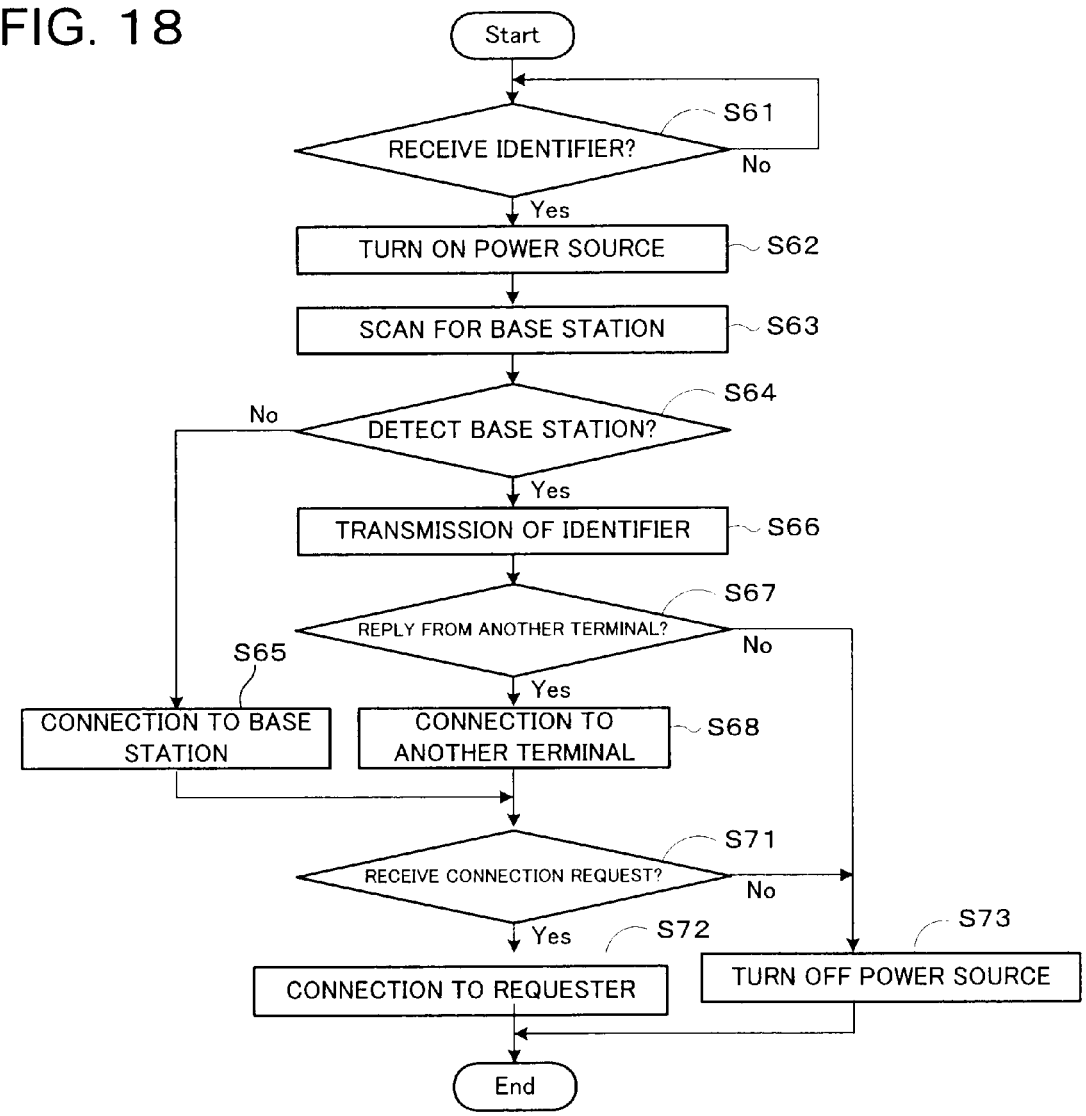
FIG. 18 is a flowchart showing an example of an operation procedure of the terminal.
Figure 19:
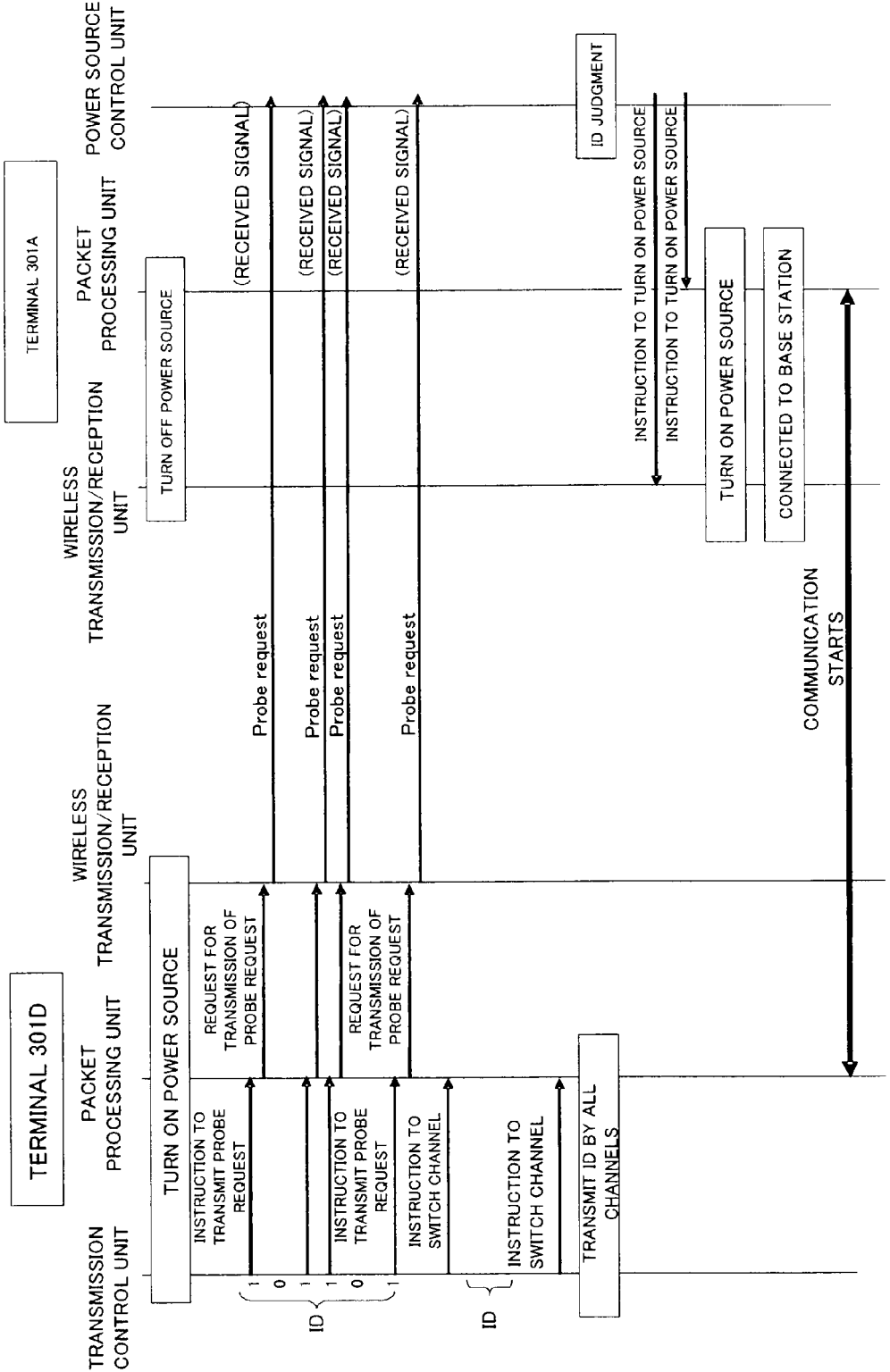
FIG. 19 is a chart showing an example of a flow of signals at a time of the operation procedures of FIG. 17 and FIG. 18.

Hereinafter, an operation of the wireless LAN system 300 will be described. FIG. 17 and FIG. 18 are flowcharts showing examples of operation procedures of the terminals 301D, 301A, respectively. FIG. 19 is a chart showing an example of a flow of signals at a time of the operation procedures of FIG. 17 and FIG. 18. It is assumed that the terminal 301A is in the power off state at the beginning (the packet processing unit 304 and the wireless transmission/reception unit 305 are in low power consumption states).

A. Operation of Terminal 301D
(1) Probe/Connection of Base Station 302 (Step S51 to Step S54)

Based on a connection request, the terminal 301D probes the base station 302 (step S51, step S52). The connection request means a request of connection to the base station 302. For example, a command requesting connection to another terminal 301 or the Internet is issued from a program operating in the terminal 301D. When there is no connection request, the terminal 301D waits until the connection request occurs.

Probe of the base station 302 is possible by either of active scan (also referred to as "probe") and passive scan. In an active method, a beam from the base station 302 is received. In a passive method, a packet for detection is transmitted to the base station 302 and a response from the base station 302 is received.

If the base station 302 is detected as a result of the probe, connection to the base station is performed (step S53, step S54).

(3) Probe/Connection of Relay Station (Terminal 301A) (Step S55 to Step S57)

If the base station 302 is not detected, the terminal 301D probes the relay station (another terminal 301). In other words, a predetermined identifier is transmitted by using a transmission pattern of a packet (step S55). A various kinds of packets can be used for this identifier as shown below.

A data frame of a predetermined length addressed to the terminal 301 itself

A probe request frame for probing the base station 302

It should be noted that this identifier can be transmitted more than once by using a plurality of channels usable in the wireless LAN.

The terminal 301D receives a reply from the terminal 301A (step S56), whereby the terminal 301A is detected. Thereafter, a connection request is transmitted from the terminal 301D to the terminal 301A, whereby the terminal 301D is connected to the terminal 301A (step S57, step S58).

B. Operation of Terminal 301A (1) Power On (Step S61, Step s62)

As already described, the terminal 301A is in the power off state. By the terminal 301A receiving the predetermined identifier, a power source of the terminal 301A is turned on (S62). In other words, an electric power is supplied to the packet processing unit 304 and the wireless transmission/reception unit 305.

It should be noted that in a case that the battery 306 is not connected to the external power source or in a case that the remaining amount of the battery 306 is equal to or less than a predetermined level, the power off state can be maintained. Interruption of relaying due to exhaustion of the battery can be prevented.

(2) Probe/Connection of Base Station (Step S63 to Step S65)

The terminal 301A probes the base station 302 (step S63). If the base station 302 is detected as a result of the probe, the terminal 301A is connected to the base station 302 (step S64, step S65).

(3) Probe/Connection of Relay Station (Terminal 301B, Terminal 301C or the like)(Step S66 to Step S68)

If the base station 302 is not detected, the terminal 301A probes a relay station (another terminal 301). In other words, a predetermined identifier is transmitted by using a transmission pattern of a packet (step S66).

By the terminal 301A receiving a reply, the terminals 301B and 301C are detected. A connection request is transmitted from the terminal 301A to the terminals 301B, 301C, whereby the terminal 301D is connected to the terminals 301B, 301C. Another terminal 301 existing in the neighborhood can be started up and used as the relay station. On the other hand, if the terminal 301A does not receive the replay within a predetermined time, the packet processing unit 304 and the wireless transmission/reception unit 305 can be made in the power off state (step S73).

(4) Connection to Terminal 301A (Step S71 to Step S73)

As stated above, the connection request is transmitted from the terminal 301D to the terminal 301A (step S57). When receiving this connection request (step S71), the terminal 301A judges whether or not the terminal 301D is connectable. When judging the terminal 301D is connectable, the terminal 301A makes connection to the terminal 301D (step S72).

Here, when the terminal 301A having been started up does not receive the connection request from the terminal 301D within a predetermined time, the packet processing unit 304 and the wireless transmission/reception unit 305 can be made into the power off state (step S73).

Figure 20:
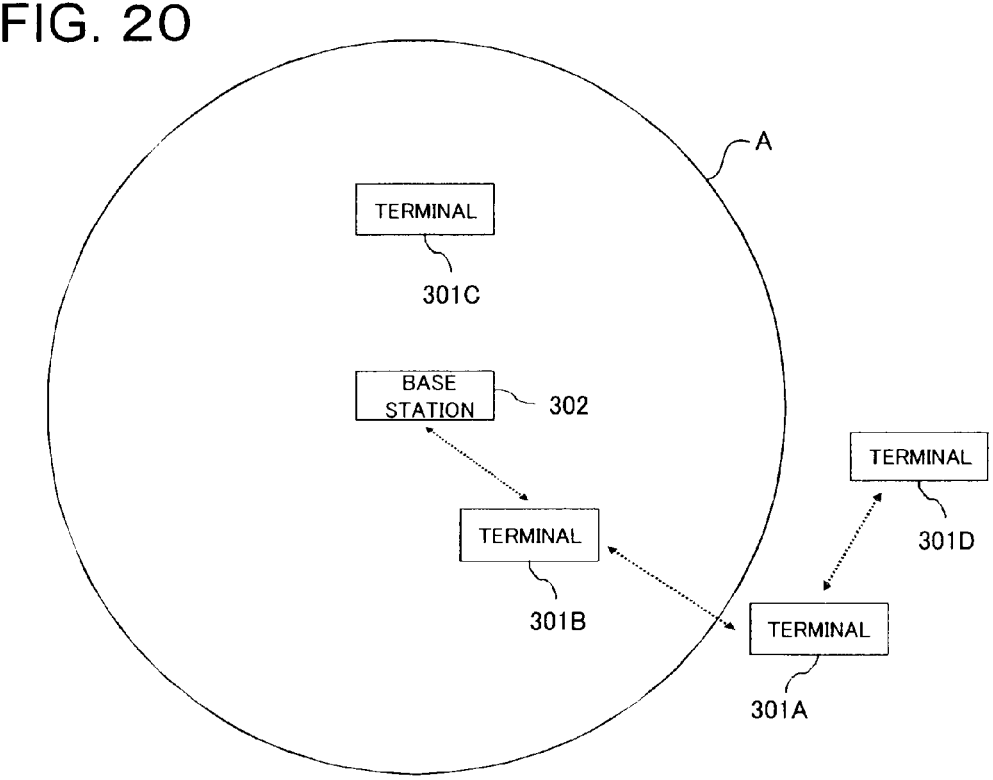
FIG. 20 is a diagram showing an example of a disposition of terminals and a base station in a wireless LAN system according to the third embodiment.

Hereinabove, basically, there is described an example of an operation in which the terminal 301D outside the area A is connected to the base station 302 with being relayed by the terminal 301A (see FIG. 14). It is also possible that the terminal 301D outside the area A is connected to the base station 302 with being relayed by the terminal 301A outside the area A and the terminal 301B within the area A (see FIG. 20).

Here, identifiers used to start up other terminals 301 can be the same for all the terminals 301A to 301D belonging to the same wireless LAN system. Further, all the terminals 301 belonging to the same wireless LAN system can have functions to alter the identifiers to the same identifier at the same timing.

The present embodiment can enjoy the following advantages.

(1) The terminal 301D outside the area A can be communicated with the base station 302 via the terminal 301A in the area A. It becomes possible to broaden a communicable area of the wireless LAN, so that a more reliable wireless LAN system can be realized. On this occasion, there is no need to add another wireless communication device other than the terminal 301 and the base station 302.

(2) It is possible to make the terminal 301 existing within the area A from the power off state to the power on state. The power on state is not always required for the terminal 301 existing within the area of the base station 302 to provide the relay function. Even when the power is in the off state as the terminal 301 itself is not in need of communication, the relay function can be provided. As a result, low power consumption of the terminal 301 becomes possible.

(3) In a case that the battery 306 is not connected to the external power source or in a case that the remaining amount of the battery 306 is small, it is possible that the terminal 301 does not provide the relay function. It is possible to prevent the battery of the terminal 301A relaying communication of another terminal 301 from shutting off during communication.

(4) Terminals 301 belonging to the same system can hold the same identifier. In this case, a terminal 301 not belonging to this system is not able to make the terminal 301 belonging to this system from the power off state to the power on state. As a result, unnecessary power consumption of the terminal 301 can be prevented, enabling lower power consumption.

(5) It is possible that all the terminals 301 belonging to the same system alter identifier at the same time. Even if the identifier is stolen by a terminal (third party's terminal) not belonging to the system, the identifier is altered when a predetermined time passes, so that it becomes possible to prevent a power source of the terminal 301 from being improperly turned on.

Other Embodiment

The present invention is not limited to the above-described embodiment, but can be realized by modifying components without departing from the scope and spirit of the invention in an implementation phase. Further, by an appropriate combination of a plurality of components disclosed in the above-described embodiment, various inventions can be made. For example, some of the components may be deleted from the whole components shown in the embodiment. Further, the components in different embodiments can be appropriately combined.

What is claimed is:

1. A wireless communication device, comprising:
a receiver configured to obtain a packet from a first receiving signal, the first receiving signal being input from an antenna;
a packet processing unit configured to interpret the packet obtained by the receiver;
a packet detection unit configured to receive a second receiving signal from the antenna, and the packet detection unit detecting presence/absence of a reception of a packet from the second receiving signal;
a judgment unit configured to judge whether or not a pattern of temporal changes of 1 and 0 indicating the presence/absence of a plurality of packets detected by the packet detection unit corresponds to a predetermined pattern; and a power source control unit configured to control power supply to the packet processing unit based on a result of a judgment by the judgment unit.

2. The wireless communication device according to claim 1, further comprising a storage unit configured to store a terminal identifier uniquely identifying a terminal to be connected with the wireless communication device;

wherein the judgment unit is configured to judge whether or not a pattern of temporal changes of the presence/absence of a plurality of packets detected by the packet detection unit corresponds to the terminal identifier stored in the storage unit.

3. The wireless communication device according to claim 1, wherein the pattern of temporal changes of the presence/absence of a plurality of packets is detected based on a first clock signal, the first clock signal is different from a second clock signal used by the receiver.

4. The wireless communication device according to claim 1, further comprising an oscillator generating a first clock signal to detect the pattern of temporal changes of the presence/absence of a plurality of packets, wherein the receiver obtains the packet without utilizing the first clock signal.

5. The wireless communication device according to claim 1, wherein the power source control unit controls power supply to the receiver based on a result of a judgment by the judgment unit.

6. The wireless communication device according to claim 1, further comprising a transmitter configured to transmit a packet to turn on another wireless communication device.

7. The wireless communication device according to claim 6, wherein the transmitter transmits a transmission stop instruction packet before transmitting the packet to turn on another wireless communication device.

8. The wireless communication device according to claim 6, wherein the packet to turn on another wireless communication device includes an identifier representing the wireless communication device with an error detection signal.

9. The wireless communication device according to claim 1, further comprising a transmitter configured to transmit a packet to turn on another wireless communication device when a number of terminals connected with the wireless communication device is equal to or more than a predetermined number.

10. The wireless communication device according to claim 1, further comprising a transmitter configured to transmit a packet to turn on another wireless communication device when a quantity of traffic processed by the wireless communication device is equal to or more than a predetermined quantity.

11. The wireless communication device according to claim 1, further comprising a transmitter configured to transmit a packet to turn on another wireless communication device when an electric field intensity or a rate of a signal from a terminal is equal to or lower than a predetermined level.

12. The wireless communication device according to claim 1, wherein the packet detection unit detects presence/absence of a reception of a probe request frame or a data frame from the second receiving signal.

13. The wireless communication device according to claim 1, wherein the judgment unit is configured to judge whether or not the pattern of temporal changes of the presence/absence of a plurality of packets detected by the packet detection unit corresponds to an identifier of a base station, the base station configured to communicate with the wireless communication device.

14. The wireless communication device according to claim 1, further comprising a battery configured to store power supplied from an external power source and to supply stored power to the packet processing unit, wherein the power source control unit controls to supply power stored in the battery to the packet processing unit when the battery is connected to the external power source and the judgment unit judges the pattern of temporal changes of the presence/absence of a plurality of packets detected by the packet detection unit corresponds to a predetermined pattern.

15. The wireless communication device according to claim 1, further comprising a battery configured to store power supplied from an external power source and to supply stored power to the packet processing unit, wherein the power source control unit controls to supply power stored in the battery to the packet processing unit when the remaining amount of the battery is equal to or less than a predetermined level and the judgment unit judges the pattern of temporal changes of the presence/absence of a plurality of packets detected by the packet detection unit corresponds to a predetermined pattern.

16. The wireless communication device according to claim 1, further comprising a communication controller configured to detect a base station to which the wireless communication device is connected, and a transmitter configured to transmit a packet to turn on another wireless communication device when the communication controller fails to detect the base station.

17. The wireless communication device according to claim 16, wherein the first receiving signal is transmitted to the base station detected by the communication controller when the communication controller succeeds to detect the base station.

18. The wireless communication device according to claim 1, wherein the predetermined pattern is determined for each communication system including a terminal to be connected with the wireless communication device.

19. The wireless communication device according to claim 1, wherein the predetermined pattern is changed at a timing which is determined for the communication system.

* * * * *